United States Patent Office 3,306,901
Patented Feb. 28, 1967

3,306,901
4-HYDROXY-5,6,7,8-TETRAHYDRO-PYRIDO-[4,3-d]-PYRIMIDINE SUBSTITUTION PRODUCTS
Gerhard Ohnacker, Biberach an der Riss, Germany, assignor, by mesne assignments, to Boehringer Ingelheim G.m.b.H., Ingelheim am Rhine, Germany, a corporation of Germany
No Drawing. Filed Mar. 14, 1963, Ser. No. 265,051
Claims priority, application Germany, Mar. 22, 1962, T 21,812
10 Claims. (Cl. 260—256.4)

This invention relates to substitution products of 4-hydroxy - 5,6,7,8-tetrahydro-pyrido-[4,3-d] - pyrimidines, their non-toxic acid addition salts, and to various methods of preparing these compounds.

More particularly, the present invention relates to substitution products of 4-hydroxy-5,6,7,8-tetrahydro-pyrido-[4,3-d]-pyrimidines of the formula

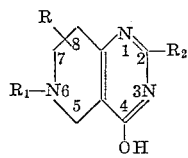

(I)

wherein R is hydrogen, alkyl, aryl or aralkyl, $R_1$ is acyclic hydrocarbon, preferably lower alkyl or lower alkenyl, and $R_2$ is hydrogen, alkyl, aralkyl, mono- or di-substituted amino, saturated basic heterocycle, such as piperidino, pyrrolidino, morpholino or N'-lower alkyl-piperazino, mercapto, alkyl-mercapto or aralkyl-mercapto, and their non-toxic, pharmacologically acceptable acid addition salts.

The compound of the present invention may be prepared by reacting a piperidone-carboxylic acid lower alkyl ester of the formula

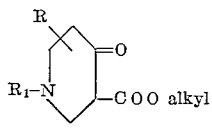

(II)

wherein R and $R_1$ have the same meanings as in Formula I, or an acid addition salt thereof with an amidine of the formula

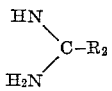

(III)

wherein $R_2$ has the same meanings as in Formula I, or with an inorganic or organic acid addition salt of said amidine.

The reaction of the piperidone-carboxylic acid ester II and the amidine III or an acid addition salt thereof is preferably carried out in the presence of an alkaline condensation agent and of an inert solvent at room temperature or at moderately elevated temperatures. Examples of suitable alkaline condensation agents are alkali metal hydroxides, alkali metal carbonates or alkali metal alcoholates. The solvent medium may be water or an organic solvent, such as methanol, ethanol, benzene, tetrahydrofuran, and the like.

In those instances where the above reaction yields compounds of the Formula I wherein $R_2$ is mercapto or substituted mercapto, the thio substituent in the 2-position may subsequently, if desired, be converted into any of the basic substitutents listed in the definition of $R_2$ above, namely, by reaction of the 2-thio compound with ammonia, a primary or a secondary amine. This reaction is preferably performed with an excess of the particular amine and, if necessary, in the presence of an inert organic solvent, such as ethanol, benzene, tetrahydrofuran, and the like. The particular amine in still larger excess may also serve as the solvent medium. The conversion reaction is performed at a temperature between 20 and 180° C. preferably at the boiling point of the solvent medium or the particular amine reactant; in the event that an amine or a solvent with a relatively low boiling point is used, it is recommended to perform the reaction in a closed vessel.

Thus, compounds of the Formula I above wherein $R_2$ represents a basic substituent, may be prepared either by a one-step or a two-step process.

After isolation from the reaction mixture, the free bases obtained by the above-described processes may, if desired, be converted into their acid addition salts. This is most conveniently accomplished by dissolving the free base in a suitable solvent and then acidifying the solution with the desired acid, preferably a pharmacologically acceptable acid, as defined below. If the free base contains more than one basic nitrogen atom, acid addition salts with more than one equivalent of the particular acid may be obtained.

The majority of the piperidone-carboxylic acid lower alkyl esters of the Formula II above, which are used as starting materials for the preparation of the novel 5,6,7,8-tetrahydro-pyrido-[4,3-d]-pyrimidine substitution products of the present invention, are well-known compounds. Those which may not be specifically described in the literature, however, may readily be prepared from iminodipropionic acid lower alkyl esters of the formula

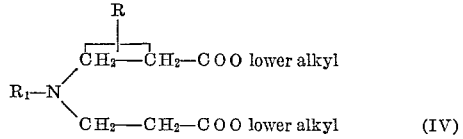

(IV)

wherein R and $R_1$ have the meanings previously defined, by means of the Dieckmann reaction [Berichte 27, 102, 965 (1894)] in the presence of sodium amide or metallic sodium.

In this manner the following piperidone-carboxylic acid lower alkyl esters of the Formula II were prepared:

(1) N-methyl-piperidone - (4)-3-carboxylic acid ethyl ester

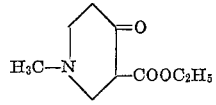

M.P. of its hydrochloride: 132° C.

(2) N-methyl-5-methyl - piperidone - (4)-3-carboxylic acid methyl ester

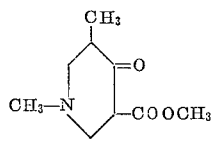

M.P. of its hydrochloride: 129° C.

(3) N-ethyl - piperidone - (4)-3-carboxylic acid ethyl ester

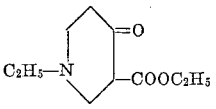

M.P. of its hydrochloride: 143° C.

(4) N-(isopropyl)-piperidone-(4)-3-carboxylic acid ethyl ester

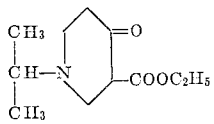

M.P. of its hydrochloride: 145° C.

(5) N-(n-butyl)-piperidone-(4)-3-carboxylic acid ethyl ester

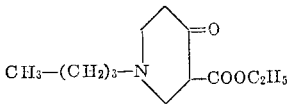

M.P. of its hydrochloride: 141° C.

(6) N-isobutyl-piperidone-(4)-3-carboxylic acid ethyl ester

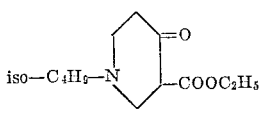

M.P. of its hydrochloride: 125° C.

(7) N - methyl - 2 (or - 6) - phenyl-piperidone-(4)-3-carboxylic acid ethyl ester

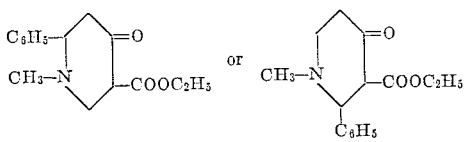

M.P. of its hydrochloride: 174° C. (The exact structure has not yet been established).

A particularly advantageous embodiment of the method of preparing the compounds of the present invention consists of starting with an imino-dipropionic acid lower alkyl ester of the Formula IV, subjecting this compound to the Dieckmann condensation reaction and, without isolating the intermediate product II, reacting the reaction mixture of the Dieckmann reaction with an amidine of the Formula III, preferably in the presense of water or an inert organic solvent.

The following examples will further illustrate the present invention and will enable others skilled in the art to understand the invention more completely. It should be understood, however, that the invention is not limited to these particular examples.

*Example 1.—Preparation of 2-benzyl-4-hydroxy-6,8-dimethyl-5,6,7,8-tetrahydro-pyrido-[4,3-d]-pyrimidine*

22.2 gm. of 1,5-dimethyl-piperidone-(4)-3-carboxylic acid methyl ester hydrochloride, 19.1 gm. of phenylacetamidine hydrochloride and 20.8 gm. of potassium carbonate were each dissolved in 50 cc. portions of water, and the solutions were combined. After briefly heating the solution to 60° C. a crystalline precipitate began to form; the reaction mixture was allowed to stand for a few hours, and the precipitate was then separated by vacuum filtration. The filter cake was recrystallized from methanol, yielding 20 gm. of the compound of the formula

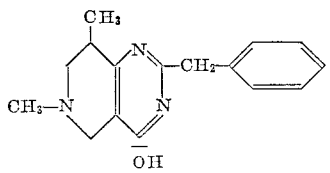

having a melting point of 193–195° C.

*Example 2.—Preparation of 2-ethylmercapto-4-hydroxy-6-methyl-5,6,7,8-tetrahydro-pyrido-[4,3-d]-pyrimidine*

115 gm. of methylamino-dipropionic acid-diethyl ester were added to a solution of 11.5 gm. of metallic sodium in 300 cc. of absolute methanol. The methanol was removed by vacuum evaporation, and the residue was heated for one hour at 130° C. in a high vacuum. The sodium enolate of N-methyl-piperidone-(4)-3-carboxylic acid ethyl ester formed thereby was dissolved in 100 cc. of water and a solution of 74 gm. of S-ethyl-isothiourea hydrobromide in 200 cc. of water was added thereto. The reaction mixture was vigorously stirred for three to four hours; thereafter, the precipitate formed during that time was separated by vacuum filtration. The filter cake was washed with cold water and was recrystallized from ethyl acetate. 65 gm. of the compound of the formula

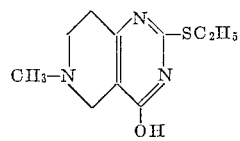

were obtained. The product had a melting point of 156–157° C.

*Example 3.—Preparation of 2 - methylmercapto - 4 - hydroxy-6,8-dimethyl - 5,6,7,8 - tetrahydro-pyrido-[4,3-d]-pyrimidine*

30 gm. of 1,5-dimethyl-piperidone-(4)-3-carboxylic acid methyl ester hydrochloride, 19 gm. of S-methyl-isothiourea sulfate and 41 gm. of potassium carbonate were each dissolved in separate 40 cc. portions of water while slightly warming, and the individual solutions were combined. The mixture was stirred for five hours, the crystalline precipitate formed during that time was filtered off, and the filter cake was recrystallized from ethanol. 23 gm. of the compound of the formula

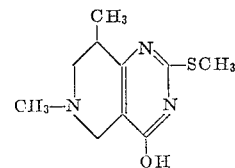

were obtained. The product had a melting point of 212° C.

*Example 4.—Preparation of 2-(di-n-butyl-amino)-4-hydroxy - 6,8 - dimethyl-5,6,7,8-tetrahydro-pyrido-[4,3-d]-pyrimidine*

A mixture of 11.2 gm. of 2-methylmercapto-4-hydroxy-6,8-dimethyl-5,6,7,8-tetrahydro - pyrido - [4,3-d]-pyrimidine and 26 gm. of di-n-butylamine was heated for 32 hours at 170° C. in an autoclave made of V₄A-stainless steel. Thereafter, the unreacted excess dibutylamine was removed by vacuum evaporation, the residue was stirred with a small amount of ethanol, and the crystalline slurry obtained thereby was vacuum filtered. The filter cake was recrystallized from ethanol, yielding 9 gm. of the compound of the formula

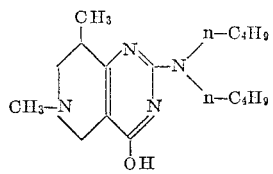

having a melting point of 134–135° C.

*Example 5.—Preparation of 2-n-hexylamino-4-hydroxy-6-n-butyl-5,6,7,8-tetrahydro-pyrido-[4,3-d]-pyrimidine*

A mixture of 10 gm. of 2-methylmercapto-4-hydroxy-6-n-butyl-5,6,7,8-tetrahydro-pyrido-[4,3 - d] - pyrimidine and 16 gm. of n-hexylamine was refluxed for twelve hours.

Thereafter, the unreacted excess n-hexylamine was removed by vacuum evaporation, the residue was stirred with a small amount of ether, the crystalline slurry formed thereby was vacuum filtered, and the filter cake was recrystallized from ethanol. 8.5 gm. of the compound of the formula

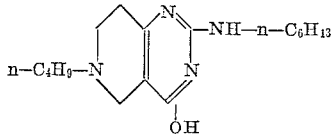

were obtained. The product had a melting point of 129° C.

Example 6

Using a procedure analogous to that described in Example 2, 2-methylmercapto-4-hydroxy-6-ethyl-5,6,7,8-tetrahydro-pyrido-[4,3-d]-pyrimidine of the formula

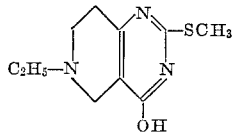

having a melting point of 187° C. was prepared from metallic sodium, ethylamino-dipropionic acid-diethyl ester and S-methyl-isothiourea hydrobromide.

Example 7

Using a procedure analogous to that described in Example 3, 2-methylmercapto-4-hydroxy-6-n-propyl-5,6,7,8-tetrahydro-pyrido-[4,3-d]-pyrimidine of the formula

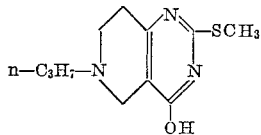

having a melting point of 198–199° C. was prepared from 1-n-propyl-piperidone-(4)-3-carboxylic acid methyl ester hydrochloride and S-methyl-isothiourea sulfate.

Example 8

Using a procedure analogous to that described in Example 3, 2-ethylmercapto-4-hydroxy-6-n-propyl-5,6,7,8-tetrahydro-pyrido-[4,3-d]-pyrimidine of the formula

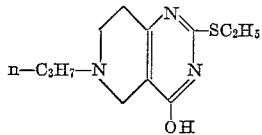

having a melting point of 132° C. was prepared from 1-n-propyl-piperidone-(4)-3-carboxylic acid methyl ester hydrochloride and S-ethyl-isothiourea sulfate.

Example 9

Using a procedure analogous to that described in Example 3, 2-ethylmercapto-4-hydroxy-6-isopropyl-5,6,7,8-tetrahydro-pyrido-[4,3-d]-pyrimidine of the formula

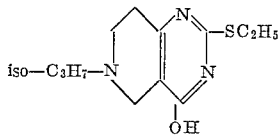

having a melting point of 153° C. was prepared from 1-isopropyl-piperidone-(4)-3-carboxylic acid methyl ester hydrochloride and S-ethyl-isothiourea sulfate.

Example 10

Using a procedure analogous to that described in Example 3, 2-methylmercapto-4-hydroxy-6-n-butyl-5,6,7,8-tetrahydro-pyrido-[4,3-d]-pyrimidine of the formula

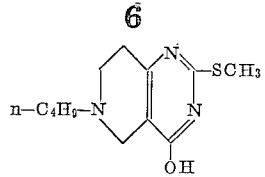

having a melting point of 184° C. was prepared from 1-n-butyl-piperidone-(4)-3-carboxylic acid methyl ester hydrochloride and S-methyl-isothiourea sulfate.

Example 11

Using a procedure analogous to that described in Example 3, 2-methylmercapto-4-hydroxy-6-isobutyl-5,6,7,8-tetrahydro-pyrido-[4,3-d]-pyrimidine of the formula

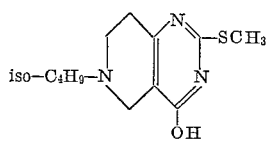

having a melting point of 207–208° C. was prepared from 1-isobutyl-piperidone-(4)-3-carboxylic acid methyl ester hydrochloride and S-methyl-isothiourea sulfate.

Example 12

Using a procedure analogous to that described in Example 1, 2-benzyl-4-hydroxy-6-methyl-5,6,7,8-tetrahydro-pyrido-[4,3-d]-pyrimidine of the formula

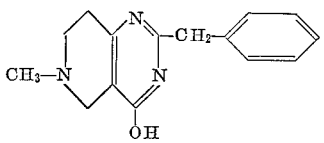

having a melting point of 218–219° C. was prepared from 1-methyl-piperidone-(4)-3-carboxylic acid methyl ester hydrochloride and phenylacetamidine hydrochloride.

Example 13

Using a procedure analogous to that described in Example 1, 2,6,8 - trimethyl-4-hydroxy-5,6,7,8-tetrahydro-pyrido-[4,3-d]-pyrimidine of the formula

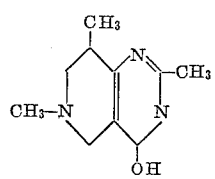

having a melting point of 197–199° C. was prepared from 1,5-dimethyl-piperidone-(4)-3-carboxylic acid methyl ester hydrochloride and acetamidine hydrochloride.

Example 14

Using a procedure analogous to that described in Example 1, 2 - benzyl-4-hydroxy-6-ethyl-5,6,7,8-tetrahydro-pyrido-[4,3-d]-pyrimidine of the formula

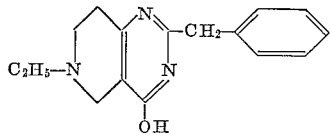

having a melting point of 177–178° C. was prepared from 1-ethyl-piperidone-(4)-3-carboxylic acid methyl ester hydrochloride and phenylacetamidine hydrochloride.

Example 15

Using a procedure analogous to that described in Example 1, 2-methyl-4-hydroxy-6-n-propyl-5,6,7,8-tetrahydro-pyrido-[4,3-d]-pyrimidine of the formula

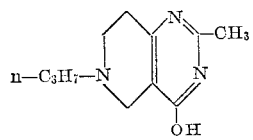

having a melting point of 165–167° C. was prepared from 1-n-propyl-piperidone-(4)-3-carboxylic acid methyl ester hydrochloride and acetamidine hydrochloride.

Example 16

Using a procedure analogous to that described in Example 1, 2-benzyl-4-hydroxy-6-isopropyl-5,6,7,8-tetrahydro-pyrido-[4,3-d]-pyrimidine of the formula

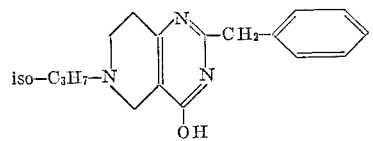

having a melting point of 163–165° C. was prepared from 1-isopropyl-piperidone-(4)-3-carboxylic acid methyl ester hydrochloride and phenylacetamidine hydrochloride.

Example 17

Using a procedure analogous to that described in Example 1, 2-methyl-4-hydroxy-6-n-butyl-5,6,7,8-tetrahydro-pyrido-[4,3-d]-pyrimidine of the formula

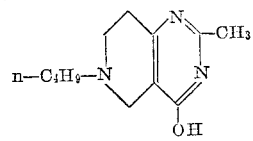

having a melting point of 146–147° C. was prepared from 1-n-butyl-piperidone-(4)-3-carboxylic acid methyl ester hydrochloride and acetamidine hydrochloride.

Example 18

Using a procedure analogous to that described in Example 1, 2-benzyl-4-hydroxy-6-n-butyl-5,6,7,8-tetrahydro-pyrido-[4,3-d]-pyrimidine of the formula

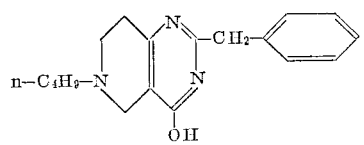

having a melting point of 113–114° C. was prepared from 1-n-butyl-piperidone-(4)-3-carboxylic acid methyl ester hydrochloride and phenylacetamidine hydrochloride. The maleic acid addition salt of the free base had a melting point of 151–153° C.

Example 19

Using a procedure analogous to that described in Example 1, 2-n-butyl-4-hydroxy-6-n-propyl-5,6,7,8,-tetrahydro-pyrido-[4,3-d]-pyrimidine of the formula

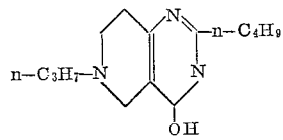

having a melting point of 109–111° C. was prepared from 1-n-propyl-piperidone-(4)-3-carboxylic acid methyl ester hydrochloride and α-amino-α-imino-pentane hydrochloride.

Example 20

Using a procedure analogous to that described in Example 4, 2-(di-n-butyl-amino)-4-hydroxy-6-methyl-5,6,7,8-tetrahydro-pyrido-[4,3-d]-pyrimidine of the formula

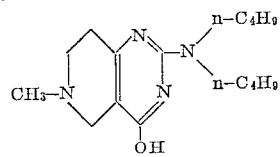

having a melting point of 135–137° C. was prepared from 2-methylmercapto-4-hydroxy-6-methyl-5,6,7,8-tetrahydro-pyrido-[4,3-d]-pyrimidine and di-n-butylamine.

Example 21

Using a procedure analogous to that described in Example 5, 2-piperidino-4-hydroxy-6-methyl-5,6,7,8-tetrahydro-pyrido-[4,3-d]-pyrimidine of the formula

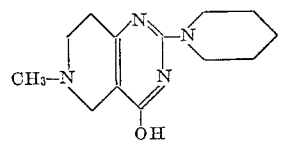

having a melting point of 231° C. was prepared from 2-methylmercapto-4-hydroxy-6-methyl-5,6,7,8,-tetrahydro-pyrido-[4,3-d]-pyrimidine and piperidine.

Example 22

Using a procedure analogous to that described in Example 5, 2-morpholino-4-hydroxy-6-methyl-5,6,7,8-tetrahydro-pyrido-[4,3-d]-pyrimidine of the formula

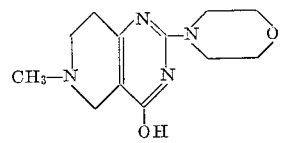

having a melting point of 222–223° C. was prepared from 2-methylmercapto-4-hydroxy-6-methyl-5,6,7,8-tetrahydropyrido-[4,3-d]-pyrimidine and morpholine.

Example 23

Using a procedure analogous to that described in Example 1, 2-dimethylamino-4-hydroxy-6,8-dimethyl-5,6,7,8-tetrahydro-pyrido-[4,3-d]-pyrimidine of the formula

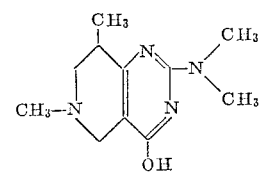

having a melting point of 185–186° C. was prepared from 1,5-dimethyl-piperidone-(4)-3-carboxylic acid methyl ester hydrochloride and N,N-dimethyl-guanidine hydrochloride.

Example 24

Using a procedure analogous to that described in Example 5, 2-morpholino-4-hydroxy-6,8-dimethyl-5,6,7,8-tetrahydro-pyrido-[4,3-d]-pyrimidine of the formula

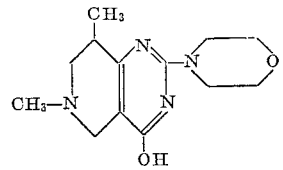

having a melting point of 197–198° C. was prepared from 2-methylmercapto-4-hydroxy-6,8-dimethyl-5,6,7,8-tetrahydro-pyrido-[4,3-d]-pyrimidine and morpholine.

Example 25

Using a procedure analogous to that described in Example 4, 2-(n-dibutyl-amino)-4-hydroxy-6-ethyl-5,6,7,8-tetrahydro-pyrido-[4,3-d]-pyrimidine of the formula

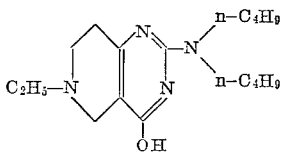

having a melting point of 94–96° C. was prepared from 2-methylmercapto-4-hydroxy - 6 - ethyl-5,6,7,8-tetrahydro-pyrido-[4,3-d]-pyrimidine and di-n-butylamine.

Example 26

Using a procedure analogous to that described in Example 1, 2-dimethylamino-4-hydroxy-6-ethyl-5,6,7,8-tetrahydro-pyrido-[4,3-d]-pyrimidine of the formula

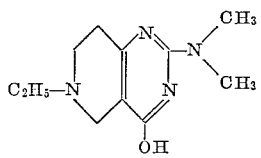

having a melting point of 56–57° C. was prepared from 1-ethyl-piperidone-(4)-3-carboxylic acid methyl ester hydrochloride and N,N-dimethyl-guanidine hydrochloride.

Example 27

Using a procedure analogous to that described in Example 5, 2-pyrrolidino-4-hydroxy-6-ethyl-5,6,7,8-tetrahydro-pyrido-[4,3-d]-pyrimidine of the formula

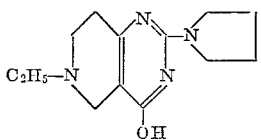

having a melting point of 190–192° C. was prepared from 2-methylmercapto-4-hydroxy - 6 - ethyl-5,6,7,8-tetrahydro-pyrido-[4,3-d]-pyrimidine and pyrrolidine.

Example 28

Using a procedure analogous to that described in Example 5, 2-piperidino-4-hydroxy - 6 - ethyl-5,6,7,8-tetrahydro-pyrido-[4,3-d]-pyrimidine of the formula

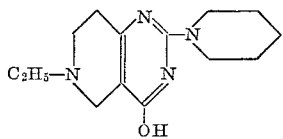

having a melting point of 170° C. was prepared from 2-methylmercapto-4-hydroxy - 6 - ethyl-5,6,7,8-tetrahydro-pyrido-[4,3-d]-pyrimidine and piperidine.

Example 29

Using a procedure analogous to that described in Example 5, 2-morpholino-4-hydroxy-6-ethyl-5,6,7,8-tetrahydro-pyrido-[4,3-d]-pyrimidine of the formula

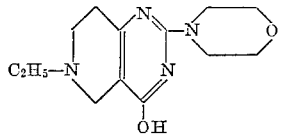

having a melting point of 186° C. was prepared from 2-methylmercapto-4-hydroxy-6 - ethyl - 5,6,7,8 - tetrahydro-pyrido-[4,3-d]-pyrimidine and morpholine.

Example 30

Using a procedure analogous to that described in Example 5, 2-(N'-methyl-piperazino) - 4 - hydroxy - 6 - ethyl-5,6,7,8-tetrahydro-pyrido-[4,3-d]-pyrimidine of the formula

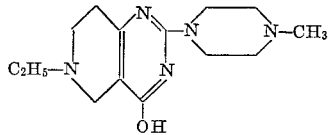

having a melting point of 162–163° C. was prepared from 2-methylmercapto-4-hydroxy-6-ethyl-5,6,7,8 - tetrahydro-pyrido-[4,3-d]-pyrimidine and N-methyl-piperazine.

Example 31

Using a procedure analogous to that described in Example 5, 2-pyrrolidino-4-hydroxy-6-n-propyl-5,6,7,8-tetrahydro-pyrido-[4,3-d]-pyrimidine of the formula

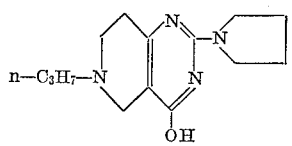

having a melting point of 182–184° C. was prepared from 2-methylmercapto-4-hydroxy-6-n-propyl-5,6,7,8 - tetrahydro-pyrido-[4,3-d]-pyrimidine and pyrrolidine.

Example 32

Using a procedure analogous to that described in Example 5, 2-piperidino-4-hydroxy-6 - n-propyl - 5,6,7,8-tetrahydro-pyrido-[4,3-d]-pyrimidine of the formula

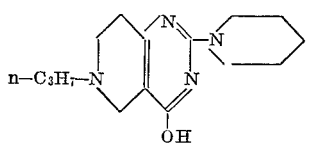

having a melting point of 184–185° C. was prepared from 2-methylmercapto-4-hydroxy-6-n-propyl - 5,6,7,8 - tetrahydro-pyrido-[4,3-d]-pyrimidine and piperidine.

Example 33

Using a procedure analogous to that described in Example 5, 2-morpholino-4-hydroxy-6-n-propyl-5,6,7,8 - tetrahydro-pyrido-[4,3-d]-pyrimidine of the formula

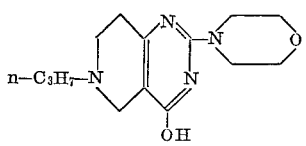

having a melting point of 186–187° C. was prepared from 2-methylmercapto-4-hydroxy-6-n - propyl - 5,6,7,8 - tetrahydro-pyrido-[4,3-d]-pyrimidine and morpholine.

Example 34

Using a procedure analogous to that described in Example 5, 2-(N'-methyl-piperazino)-4-hydroxy-6 - n - propyl-5,6,8,7-tetrahydro-pyrido-[4,3-d]-pyrimidine of the formula

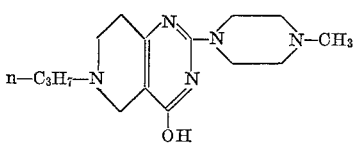

having a melting point of 148–150° C. was prepared from 2-methylmercapto-4-hydroxy-6-n-propyl-5,6,7,8 - tetrahydro-pyrido-[4,3-d]-pyrimidine and N-methyl-piperazine.

Example 35

Using a procedure analogous to that described in Example 5, 2-piperidino-4-hydroxy-6-isopropyl-5,6,7,8-tetrahydro-pyrido-[4,3-d]-pyrimidine of the formula

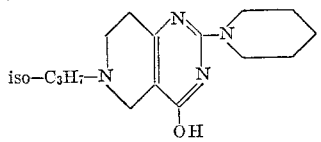

having a melting point of 209–211° C. was prepared from 2-methylmercapto-4-hydroxy-6-isopropyl-5,6,7,8-tetrahydro-pyrido-[4,3-d]-pyrimidine and piperidine.

Example 36

Using a procedure analogous to that described in Example 5, 2-morpholino-4-hydroxy-6-isopropyl-5,6,7,8-tetrahydro-pyrido-[4,3-d]-pyrimidine of the formula

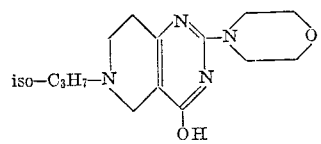

having a melting point of 230–232° C. was prepared from 2-methylmercapto-4-hydroxy-6-isopropyl-5,6,7,8-tetrahydro-pyrido-[4,3-d]-pyrimidine and morpholine.

Example 37

Using a procedure analogous to that described in Example 5, 2-(di-n-butylamino)-4-hydroxy-6-n-butyl-5,6,7,8-tetrahydro-pyrido-[4,3-d]-pyrimidine of the formula

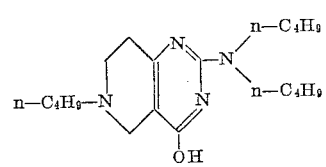

having a melting point of 104° C. was prepared from 2-methyl-mercapto-4-hydroxy-6-n-5,6,7,8-tetrahydro-pyrido-[4,3-d]-pyrimidine and di-n-butylamine.

Example 38

Using a procedure analogous to that described in Example 5, 2-pyrrolidino-4-hydroxy-6-n-butyl-5,6,7,8-tetrahydro-pyrido-[4,3-d]-pyrimidine of the formula

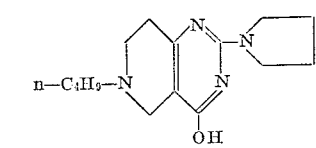

having a melting point of 172–173° C. was prepared from 2-methylmercapto-4-hydroxy-6-n-butyl-5,6,7,8-tetrahydro-pyrido-[4,3-d]-pyrimidine and pyrrolidine.

Example 39

Using a procedure analogous to that described in Example 5, 2-piperidino-4-hydroxy-6-n-butyl-5,6,7,8-tetrahydro-pyrido-[4,3-d]-pyrimidine of the formula

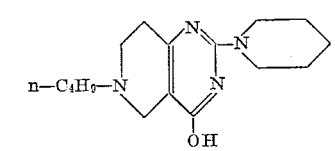

having a melting point of 171–172° C. was prepared from 2-methylmercapto-4-hydroxy-6-n-butyl-5,6,7,8-tetrahydro-pyrido-[4,3-d]-pyrimidine and piperidine.

Example 40

Using a procedure analogous to that described in Example 5, 2-morpholino-4-hydroxy-6-n-butyl-5,6,7,8-tetrahydro-pyrido-[4,3-d]-pyrimidine of the formula

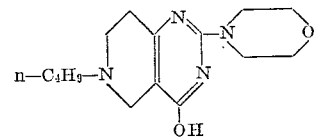

having a melting point of 172° C. was prepared from 2-methylmercapto-4-hydroxy-6-n-butyl-5,6,7,8-tetrahydro-pyrido-[4,3-d]-pyrimidine and morpholine.

Example 41

Using a procedure analogous to that described in Example 5, 2-(N'-methyl-piperazino)-4-hydroxy-6-n-butyl-5,6,7,8-tetrahydro-pyrido-[4,3-d]-pyrimidine of the formula

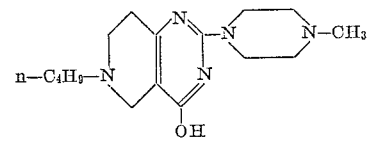

having a melting point of 161–162° C. was prepared from 2-methylmercapto-4-hydroxy-6-n-butyl-5,6,7,8-tetrahydro-pyrido-[4,3-d]-pyrimidine and N-methyl-piperazine.

Example 42

Using a procedure analogous to that described in Example 5, 2-n-hexylamino-4-hydroxy-6-isobutyl-5,6,7,8-tetrahydro-pyrido-[4,3-d]-pyrimidine of the formula

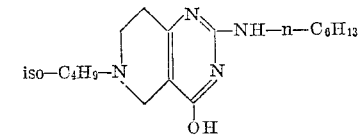

having a melting point of 146–147° C. was prepared from 2-methylmercapto-4-hydroxy-6-isobutyl-5,6,7,8-tetrahydro-pyrido-[4,3-d]-pyrimidine and n-hexylamine.

Example 43

Using a procedure analogous to that described in Example 5, 2-(di-n-butylamino)-4-hydroxy-6-isobutyl-5,6,7,8-tetrahydro-pyrido-[4,3-d]-pyrimidine of the formula

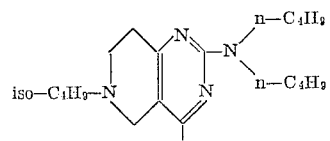

having a melting point of 99–100° C. was prepared from 2-methylmercapto-4-hydroxy-6-isobutyl-5,6,7,8-tetrahydro-pyrido-[4,3-d]-pyrimidine and di-n-butylamine.

Example 44

Using a procedure analogous to that described in Example 5, 2-pyrrolidino-4-hydroxy-6-isobutyl-5,6,7,8-tetrahydro-pyrido-[4,3-d]-pyrimidine of the formula

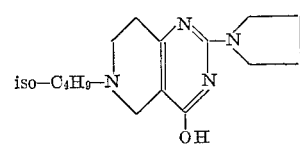

having a melting point of 213° C. was prepared from 2-methyl-mercapto-4-hydroxy-6-isobutyl-5,6,7,8-tetrahydro-pyrido-[4,3-d]-pyrimidine and pyrrolidine.

Example 45

Using a procedure analogous to that described in Example 5, 2 - piperidino - 4 - hydroxy - 6 - isobutyl - 5,6,7, 8 - tetrahydro - pyrido - [4,3 - d] - pyrimidine of the formula

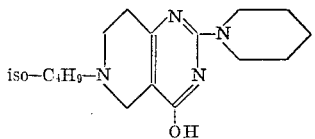

having a melting point of 197° C. was prepared from 2-methyl - mercapto - 4 - hydroxy - 6 - isobutyl - 5,6,7,8-tetrahydro - pyrido - [4,3 - d] - pyrimidine and piperidine.

Example 46

Using a procedure analogous to that described in Example 5, 2 - morpholino - 4 - hydroxy - 6 - isobutyl - 5,6, 7,8 - tetrahydro-pyrido - [4,3 - d] - pyrimidine of the formula

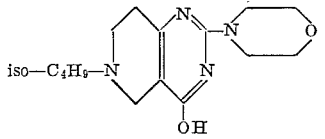

having a melting point of 196° C. was prepared from 2-methyl - mercapto - 4 - hydroxy - 6 - isobutyl - 5,6,7,8-tetrahydro - pyrido - [4,3 - d] - pyrimidine and morpholine.

Example 47

Using a procedure analogous to that described in Example 5, 2 - (N' - methyl - piperazino) - 4 - hydroxy-6 - isobutyl - 5,6,7,8 - tetrahydro - pyrido - [4,3 - d]-pyrimidine of the formula

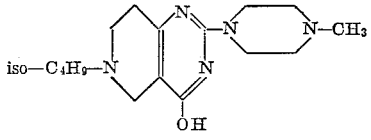

having a melting point of 178–180° C. was prepared from 2 - methylmercapto - 4 - hydroxy - 6 -isobutyl - 5,6,7,8-tetrahydro - pyrido - [4,3 - d] - pyrimidine and N - methyl-piperazine.

*Example 48. — Preparation of 2-dimethylamino-4-hydroxy - 6 - methyl - 5,6,7,8 - tetrahydro - pyrido - [4, 3-d]-pyrimidine*

4.1 gm. of N,N-dimethyl-guanidine sulfate and 6.7 gm. of 1-methyl-3-carbethoxy-piperidone-(4) hydrochloride were added to a solution of 1.4 gm. of metallic sodium in 150 cc. of absolute ethanol, and the resulting mixture was refluxed for five hours while stirring. The precipitate formed thereby was filtered off, and the filtrate was evaporated to dryness in vacuo. The residue was recrystallized from ethanol, yielding 3.4 gm. of the compound of the formula

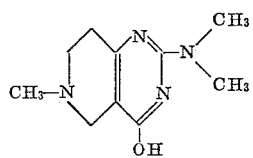

having a melting point of 204–205° C.

Example 49

Using a procedure analogous to that described in Example 48, 2 - dimethylamino - 4 - hydroxy - 6 - allyl - 5, 6,7,8-tetrahydro-pyrido-[4,3-d]-pyrimidine of the formula

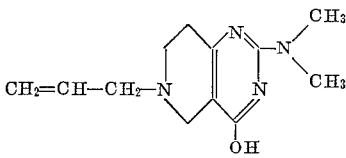

having a melting point of 195–196° C. was prepared from N,N-dimethyl-guanidine sulfate and 1-allyl-3-carbethoxy-piperidone-(4) hydrochloride.

Example 50

Using a procedure analogous to that described in Example 5, 2-morpholino-4-hydroxy-6-allyl - 5,6,7,8 - tetrahydro-pyrido-[4,3-d]-pyrimidine of the formula

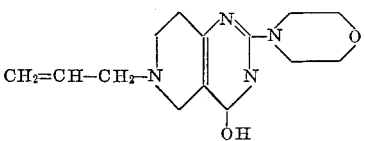

having a melting point of 196–197° C. was prepared from 2-methylmercapto-4-hydroxy-6-allyl-5,6,7,8 - tetrahydro-pyrido-[4,3-d]-pyrimidine and morpholine.

Example 51

Using a procedure analogous to that described in Example 5, 2 - piperidino - 4 - hydroxy-6-methyl - 7 (or -5)-phenyl-5,6,7,8-tetrahydro-pyrido-[4,3-d] - pyrimidine of the formula

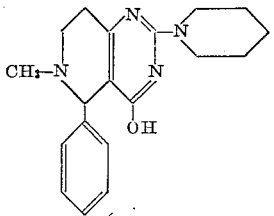

or

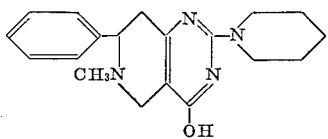

having a melting point of 240–242° C. was prepared from 2-methylmercapto-4-hydroxy-6-methyl-7 (or -5) -phenyl-5,6,7,8-tetrahydro-pyrido-[4,3-d]-pyrimidine and piperidine. (The exact structure has not yet been established.)

Example 52

Using a procedure analogous to that described in Example 4, 2-(di-n-butyl-amino)-4-hydroxy-6-n-propyl-5,6, 7,8-tetrahydro-pyrido-[4,3-d]-pyrimidine of the formula

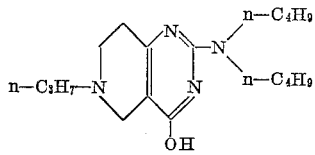

having a melting point of 95–97° C. was prepared from 2-methylmercapto-4-hydroxy-6-n-propyl - 5,6,7,8 - tetrahydropyrido-[4,3-d]-pyrimidine and di-n-butylamine.

Example 53

Using a procedure analogous to that described in Example 5, 2-(benzyl-methyl-amino)-4-hydroxy-6-n-propyl- 5,6,7,8-tetrahydro-pyrido-[4,3-d] - pyrimidine of the formula

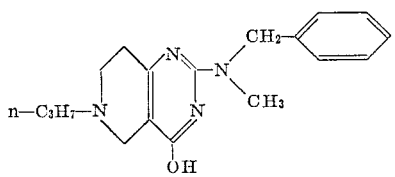

having a melting point of 136–138° C. was prepared from 2-methylmercapto-4-hydroxy-6-n-propyl - 5,6,7,8 - tetrahydropyrido-[4,3-d]-pyrimidine and benzyl-methylamine.

*Example 54*

Using a procedure analogous to that described in Example 5, 2-(di-n-butylamino)-4-hydroxy-6-isopropyl-5,6,7,8-tetrahydro-pyrido-[4,3-d]-pyrimidine of the formula

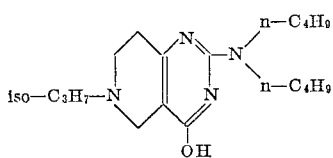

having a melting point of 112° C. was prepared from 2-methylmercapto-4-hydroxy-6 - isopropyl - 5,6,7,8 - tetrahydropyrido-[4,3-d]-pyrimidine and di-n-butylamine.

*Example 55*

Using a procedure analogous to that described in Example 48, 2-dimethylamino-4-hydroxy-6-n-butyl-5,6,7,8-tetrahydro-pyrido-[4,3-d]-pyrimidine of the formula

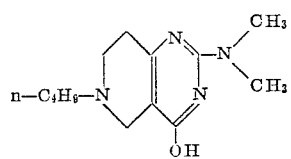

having a melting point of 154–156° C. was prepared from N,N-dimethyl-guanidine sulfate and 1-n-butyl-3-carbethoxypiperidone-(4) hydrochloride.

*Example 56*

Using a procedure analogous to that described in Example 48, 2-dimethylamino-4-hydroxy-6-isobutyl-5,6,7,8-tetrahydro-pyrido-[4,3-d]-pyrimidine of the formula

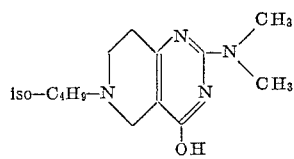

having a melting point of 211–212° C. was prepared from N,N-dimethyl-guanidine sulfate and 1-isobutyl-3-carbethoxypiperidone-(4) hydrochloride.

*Example 57*

Using a procedure analogous to that described in Example 5, 2-n-hexylamino-4-hydroxy-6-n - hexyl - 5,6,7,8-tetrahydro-pyrido-[4,3-d]-pyrimidine of the formula

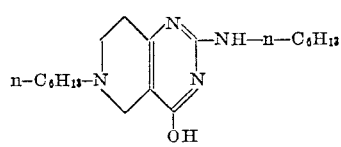

having a melting point of 120–121° C. was prepared from 2-methylmercapto-4-hydroxy-6-n-hexyl - 5,6,7,8 - tetrahydropyrido-[4,3-d]-pyrimidine and n-hexylamine.

*Example 58*

Using a procedure analogous to that described in Example 5, 2-(2'-ethyl-n-hexyl-amino)-4-hydroxy-6-n-hexyl-5,6,7,8-tetrahydro-pyrido-[4,3-d] - pyrimidine hydrate of the formula

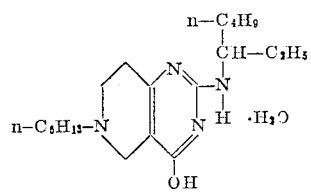

having a melting point of 90–93° C. was prepared from 2-methylmercapto-4-hydroxy-6-n - hexyl - 5,6,7,8 - tetrahydro-pyrido-[4,3-d]-pyrimidine and ethyl-n-hexylamine.

*Example 59*

Using a procedure analogous to that described in Example 4, 2-dimethylamino-4-hydroxy-6-n-hexyl - 5,6,7,8-tetrahydro-pyrido-[4,3-d]-pyrimidine of the formula

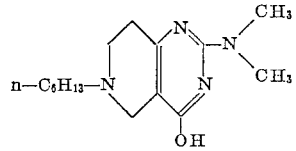

having a melting point of 141–143° C. was prepared from 2-methylmercapto-4-hydroxy-6-n-hexyl - 5,6,7,8 - tetrahydro-pyrido-[4,3-d]-pyrimidine and dimethylamine.

*Example 60*

Using a procedure analogous to that described in Example 5, 2-(di-n-butylamino)-4-hydroxy-6-n-hexyl-5,6,7,8-tetrahydro-pyrido-[4,3-d]-pyrimidine of the formula

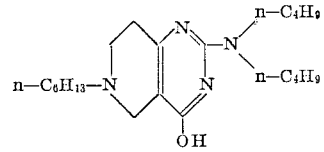

having a melting point of 83–84° C. was prepared from 2-methylmercapto-4-hydroxy-6-n - hexyl - 5,6,7,8 - tetrahydro-pyrido-[4,3-d]-pyrimidine and di-n-butylamine.

*Example 61*

Using a procedure analogous to that described in Example 5, 2-piperidino-4-hydroxy-6-n-hexyl-5,6,7,8-tetrahydro-pyrido-[4,3-d]-pyrimidine of the formula

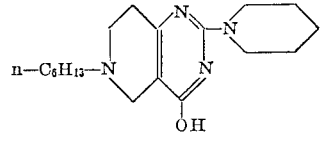

having a melting point of 160–161° C. was prepared from 2-methylmercapto-4-hydroxy-6-n-hexyl - 5,6,7,8 - tetrahydro-pyrido-[4,3-d]-pyrimidine and piperidine.

*Example 62*

Using a procedure analogous to that described in Example 5, 2-morpholino-4-hydroxy-6-n-hexyl-5,6,7,8-tetrahydro-pyrido-[4,3-d]-pyrimidine of the formula

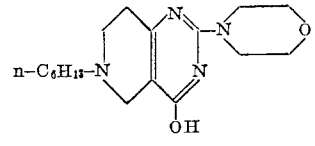

having a melting point of 157–158° C. was prepared from 2-methylmercapto-4-hydroxy-6-n - hexyl - 5,6,7,8, - tetrahydro-pyrido-[4,3-d]-pyrimidine and morpholine.

Example 63

Using a procedure analogous to that described in Example 5, 2-n-hexylamino-4-hydroxy-6-n-hexyl-8-methyl-5,6,7,8-tetrahydro-pyrido-[4,3-d]-pyrimidine of the formula

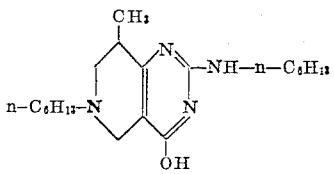

having a melting point of 64-65° C. was prepared from 2-methylmercapto-4-hydroxy-6-n-hexyl-8-methyl-5,6,7,8-tetrahydro-pyrido-[4,3-d]-pyrimidine and n-hexylamine.

Example 64

Using a procedure analogous to that described in Example 5, 2-(di-n-propylamino)-4-hydroxy-6-n-hexyl-8-methyl-5,6,7,8-tetrahydro-pyrido-[4,3-d]-pyrimidine of the formula

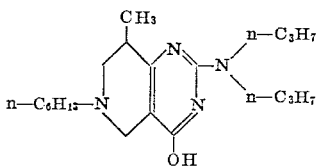

having a melting point of 79-80° C. was prepared from 2-methylmercapto-4-hydroxy-6-n-hexyl-8-methyl-5,6,7,8-tetrahydro-pyrido-[4,3-d]-pyrimidine and di-n-propylamine.

Example 65

Using a procedure analogous to that described in Example 5, 2-(di-n-butylamino)-4-hydroxy-6-n-hexyl-8-methyl-5,6,7,8-tetrahydro-pyrido-[4,3-d]-pyrimidine of the formula

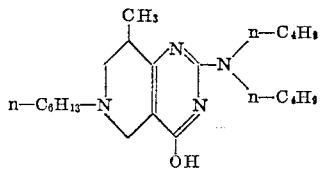

having a melting point of 93-95° C. was prepared from 2-methylmercapto-4-hydroxy-6-n-hexyl-8-methyl-5,6,7,8-tetrahydro-pyrido-[4,3-d]-pyrimidine and di-n-butylamine.

Example 66

Using a procedure analogous to that described in Example 5, 2-piperidino-4-hydroxy-6-n-hexyl-8-methyl-5,6,7,8-tetrahydro-pyrido-[4,3-d]-pyrimidine of the formula

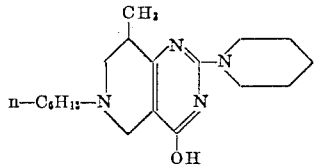

having a melting point of 102-103° C. was prepared from 2-methylmercapto-4-hydroxy-6-n-hexyl-8-methyl-5,6,7,8-tetrahydro-pyrido-[4,3-d]-pyrimidine and piperidine.

Example 67

Using a procedure analogous to that described in Example 5, 2-(di-n-butylamino)-4-hydroxy-6-isobutyl-8-methyl-5,6,7,8-tetrahydro-pyrido-[4,3-d]-pyrimidine of the formula

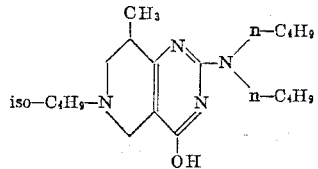

having a melting point of 120-121° C. was prepared from 2-methylmercapto-4-hydroxy-6-isobutyl-8-methyl-5,6,7,8-tetrahydro-pyrido-[4,3-d]-pyrimidine and di-n-butylamine.

Example 68

Using a procedure analogous to that described in Example 48, 2-n-butyl-4-hydroxy-6-methyl-5,6,7,8-tetrahydro-pyrido-[4,3-d]-pyrimidine of the formula

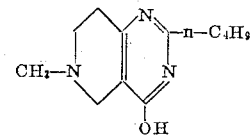

having a melting point of 156-157° C. was prepared from α-amino-α-imino-pentane sulfate and 1-methyl-3-carbethoxy-piperidone-(4) hydrochloride.

Example 69

Using a procedure analogous to that described in Example 48, 2-n-propyl-4-hydroxy-6-methyl-8-methyl-5,6,7,8-tetrahydro-pyrido-[4,3-d]-pyrimidine of the formula

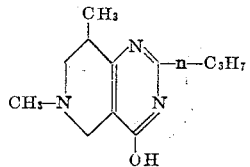

having a melting point of 132-134° C. was prepared from α-amino-α-imino-butane sulfate and 1,5-dimethyl-3-carbethoxy-piperidone-(4)-hydrochloride.

Example 70

Using a procedure analogous to that described in Example 48, 2-n-butyl-4-hydroxy-6-methyl-8-methyl-5,6,7,8-tetrahydro-pyrido-[4,3-d]-pyrimidine of the formula

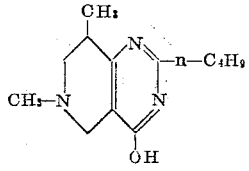

having a melting point of 131-133° C. was prepared from α-amino-α-imino-pentane sulfate and 1,5-dimethyl-3-carbethoxy-piperidone-(4)-hydrochloride.

Example 71

Using a procedure analogous to that described in Example 3, 2-methyl-4-hydroxy-6-allyl-5,6,7,8-tetrahydro-pyrido-[4,3-d]-pyrimidine of the formula

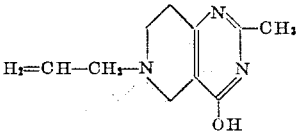

having a melting point of 188-189° C. was prepared from 1-methyl-3-carbomethoxy-piperidone-(4) hydrochloride and acetamidine sulfate.

Example 72

Using a procedure analogous to that described in Example 48, 2-n-propyl-4-hydroxy-6-allyl-5,6,7,8-tetrahydro-pyrido-[4,3-d]-pyrimidine of the formula

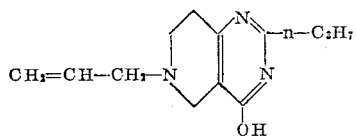

having a melting point of 119–120° C. was prepared from 1-allyl-3-carbethoxy-piperidone-(4) hydrochloride and α-amino-α-imino-butane sulfate.

Example 73

Using a procedure analogous to that described in Example 48, 2-n-butyl-4-hydroxy-6-allyl-5,6,7,8-tetrahydro-pyrido-[4,3-d]-pyrimidine of the formula

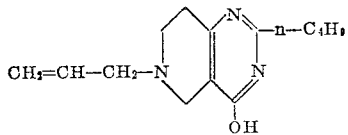

having a melting point of 100–102° C. was prepared from 1-allyl-3-carbethoxy-piperidone-(4) hydrochloride and α-amino-α-imino-pentane sulfate.

Example 74

Using a procedure analogous to that described in Example 48, 2,6-di-n-propyl-4-hydroxy-5,6,7,8-tetrahydro-pyrido-[4,3-d]-pyrimidine of the formula

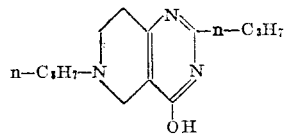

having a melting point of 100–101° C. was prepared from 1-n-propyl-3-carbethoxy-piperidone - (4) - hydrochloride and α-amino-α-imino-butane sulfate.

Example 75

Using a procedure analogous to that described in Example 48, 2-methyl-4-hydroxy-6-isopropyl-5,6,7,8-tetrahydro-pyrido-[4,3-d]-pyrimidine of the formula

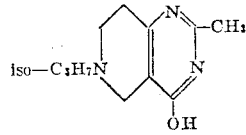

having a melting point of 168–170° C. was prepared from 1-isopropyl-3-carbethoxy - piperidone - (4) hydrochloride and acetamidine sulfate.

Example 76

Using a procedure analogous to that described in Example 48, 2-n-propyl-4-hydroxy-6-isopropyl-5,6,7,8-tetrahydro-pyrido-[4,3-d]-pyrimidine of the formula

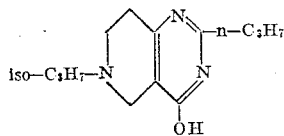

having a melting point of 128–129° C. was prepared from 1-isopropyl-3-carbethoxy-piperidone - (4) hydrochloride and α-amino-α-imino-butane sulfate.

Example 77

Using a procedure analogous to that described in Example 48, 2-n-butyl-4-hydroxy-6-isopropyl-5,6,7,8-tetrahydro-pyrido-[4,3-d]-pyrimidine of the formula

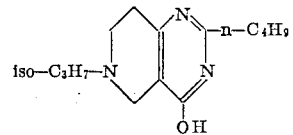

having a melting point of 102–104° C. was prepared from 1-isopropyl-3-carbethoxy-piperidone - (4) hydrochloride and α-amino-α-imino-pentane sulfate.

Example 78

Using a procedure analogous to that described in Example 1, 2-benzyl-4-hydroxy-6,7-dimethyl-5,6,7,8-tetrahydro-pyrido-[4,3-d]-pyrimidine of the formula

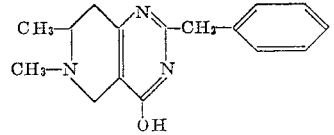

having a melting point of 195–196° C. was prepared from 1,6-dimethyl-3-carbomethoxy-piperidone-(4) hydrochloride and phenylacetamidine hydrochloride.

Example 79

Using a procedure analogous to that described in Example 48, 2-n-propyl-4-hydroxy-6-n-butyl-5,6,7,8-tetrahydro-pyrido-[4,3-d]-pyrimidine of the formula

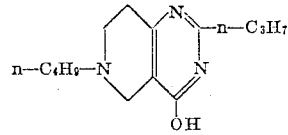

having a melting point of 103–105° C. was prepared from 1-n-butyl-3-carbethoxy-piperidone-(4) hydrochloride and α-amino-α-imino-butane sulfate.

Example 80

Using a procedure analogous to that described in Example 48, 2-isopropyl-4-hydroxy-6-n-butyl-5,6,7,8-tetrahydro-pyrido-[4,3-d]-pyrimidine of the formula

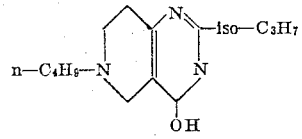

having a melting point of 179–180° C. was prepared from 1-n-butyl-3-carbethoxy-piperidone-(4) hydrochloride and isopropyl-formamidine sulfate.

Example 81

Using a procedure analogous to that described in Example 48, 2,6-di-n-butyl-4-hydroxy-5,6,7,8-tetrahydro-pyrido-[4,3-d]-pyrimidine of the formula

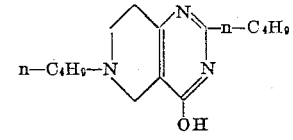

having a melting point of 95° C. was prepared from 1-n-butyl-3-carbethoxy-piperidone-(4) hydrochloride and α-amino-α-imino-pentane sulfate.

Example 82

Using a procedure analogous to that described in Example 48, 2-methyl-4-hydroxy-6-isobutyl-5,6,7,8-tetrahydro-pyrido-[4,3-d]-pyrimidine of the formula

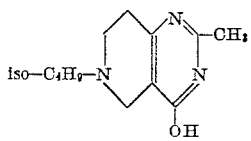

having a melting point of 179–181° C. was prepared from 1-methyl-3-carbethoxy-piperidone-(4) hydrochloride and acetamidine sulfate.

Example 83

Using a procedure analogous to that described in Example 48, 2-n-propyl-4-hydroxy-6-isobutyl-5,6,7,8-tetrahydro-pyrido-[4,3-d]-pyrimidine of the formula

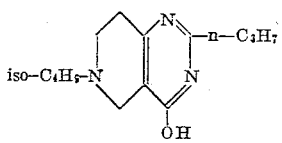

having a melting point of 117–118° C. was prepared from 1-isobutyl-3-carbethoxy-piperidone-(4) hydrochloride and α-amino-α-imino-butane sulfate.

Example 84

Using a procedure analogous to that described in Example 48, 2-n-butyl-4-hydroxy-6-isobutyl-5,6,7,8-tetrahydro-pyrido-[4,3-d]-pyrimidine of the formula

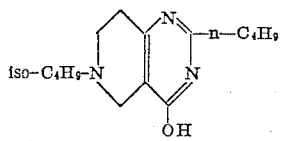

having a melting point of 113–114° C. was prepared from 1-isobutyl-3-carbethoxy-piperidone-(4) hydrochloride and α-amino-α-imino-pentane sulfate.

Example 85

Using a procedure analogous to that described in Example 48, 2-benzyl-4-hydroxy-6-isobutyl-5,6,7,8-tetrahydro-pyrido-[4,3-d]-pyrimidine of the formula

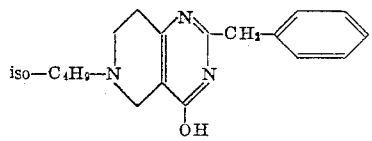

having a melting point of 152–155° C. was prepared from 1-isobutyl-3-carbethoxy-piperidone-(4) hydrochloride and phenylacetamidine sulfate.

Example 86

Using a procedure analogous to that described in Example 1, 2-benzyl-4-hydroxy-6-n-hexyl-5,6,7,8-tetra-hydropyrido-[4,3-d]-pyrimidine of the formula

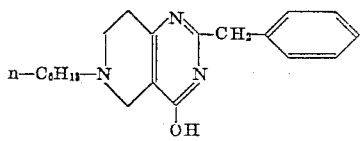

having a melting point of 120–121° C. was prepared from 1-n-hexyl-3-carbomethoxy-piperidone-(4) hydrochloride and phenylacetamidine hydrochloride.

Example 87

Using a procedure analogous to that described in Example 48, 2,8-dimethyl-4-hydroxy-6-n-hexyl-8-methyl-5,6,7,8-tetrahydro-pyrido-[4,3-d]-pyrimidine of the formula

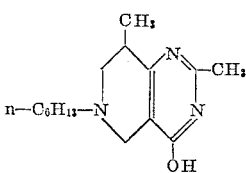

having a melting point of 95–97° C. was prepared from 1-n-hexyl-3-carbethoxy-5-methyl-piperidone-(4) hydrochloride and acetamidine sulfate.

Example 88

Using a procedure analogous to that described in Example 48, 2-n-butyl-4-hydroxy-6-n-hexyl-8-methyl-5,6,7,8-tetrahydro-pyrido-[4,3-d]-pyrimidine of the formula

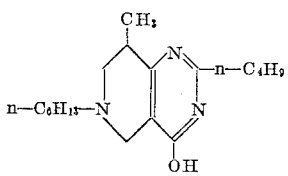

having a melting point of 81–82° C. was prepared from 1-n-hexyl-3-carbethoxy-5-methyl-piperidone-(4) hydrochloride and α-amino-α-imino-pentane sulfate.

Example 89

Using a procedure analogous to that described in Example 1,2-benzyl-4-hydroxy-6-n-hexyl-8-methyl-5,6,7,8-tetrahydro-pyrido-[4,3-d]-pyrimidine of the formula

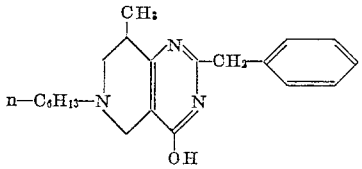

having a melting point of 88–89° C. was prepared from 1-n-hexyl-3-carbethoxy-5-methyl-piperidone-(4) hydrochloride and phenylacetamidine hydrochloride.

Example 90

Using a procedure analogous to that described in Example 3, 2-(p-chlorobenzyl-mercapto)-4-hydroxy-6,8-dimethyl-5,6,7,8-tetrahydro-pyrido-[4,3-d]-pyrimidine of the formula

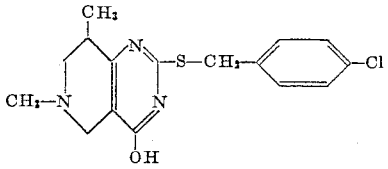

having a melting point of 188–189° C. was prepared from 1,5-dimethyl-3-carbomethoxy-piperidone-(4) hydrochloride and S-(p-chlorobenzyl)-isothiourea sulfate.

Example 91

Using a procedure analogous to that described in Example 3, 2-(o-chlorobenzyl-mercapto)-4-hydroxy-6,8-dimethyl-5,6,7,8-tetrahydro-pyrido-[4,3-d]-pyrimidine of the formula

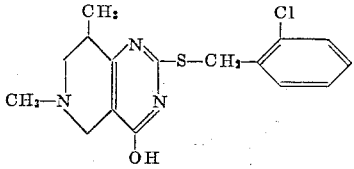

having a melting point of 197–199° C. was prepared from 1,5-dimethyl-3-carbomethoxy-piperidone-(4) hydrochloride and S-(o-chlorobenzyl)-isothiourea sulfate.

Example 92

Using a procedure analogous to that described in Example 3, 2-methylmercapto - 4 - hydroxy-6-allyl-5,6,7,8-tetrahydro-pyrido-[4,3-d]-pyrimidine of the formula

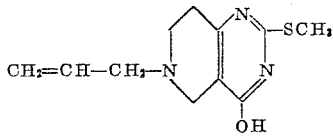

having a melting point of 191–192° C. was prepared from 1-allyl - 3 - carbomethoxy-piperidone-(4)-hydrochloride and S-methyl-isothiourea sulfate.

Example 93

Using a procedure analogous to that described in Example 3, 2-methylmercapto - 4 - hydroxy-6-methyl-7-(or 5)-phenyl-5,6,7,8-tetrahydro - pyrido - [4,3-d]-pyrimidine of the formula

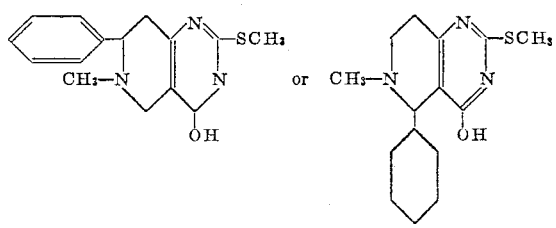

having a melting point of 216–218° C. was prepared from 1-methyl-6-(or-2)-phenyl-5,6,7,8-tetrahydro-pyrido- from 1-methyl-6-(or-2)-phenyl - 3 - carbethoxy-piperidone-(4) hydrochloride and S-methyl-isothiourea sulfate. (The exact structure has not yet been established.)

Example 94

Using a procedure analogous to that described in Example 3, 2-methylmercapto-4-hydroxy - 6 - isobutyl-8-methyl-5,6,7,8-tetrahydro-pyrido - [4,3-d] - pyrimidine of the formula

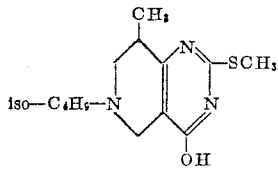

having a melting point of 195–196° C. was prepared from 1-isobutyl-5-methyl-3-carbomethoxy-piperidone - (4) - hydrochloride and S-methyl-isothiourea sulfate.

Example 95

Using a procedure analogous to that described in Example 3, 2-methylmercapto-4-hydroxy-6-n-hexyl-5,6,7,8-tetrahydro-pyrido-[4,3-d]-pyrimidine of the formula

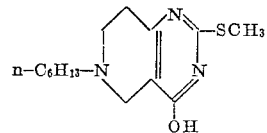

having a melting point of 168° C. was prepared from 1-n - hexyl - 3-carbomethoxy-piperidone-(4) hydrochloride and S-methyl-isothiourea sulfate.

Example 96

Using a procedure analogous to that described in Example 3, 2 - (p - chlorobenzyl-mercapto)-4-hydroxy-6-n-hexyl-5,6,7,8-tetrahydro-pyrido-[4,3-d]-pyrimidine of the formula

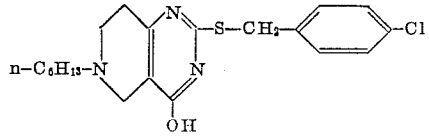

having a melting point of 95–97° C. was prepared from 1 - n-hexyl-3-carbomethoxy-piperidone-(4) hydrochloride and S-(p-chlorobenzyl)-isothiourea sulfate.

Example 97

Using a procedure analogous to that described in Example 3, 2-methylmercapto-4-hydroxy-6-n-hexyl-8-methyl-5,6,7,8-tetrahydro-pyrido-[4,3-d]-pyrimidine of the formula

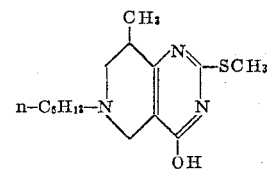

having a melting point of 142–143° C. was prepared from 1 - n - hexyl-5-methyl-3-carbomethoxy-piperidone-(4) hydrochloride and S-methyl-isothiourea sulfate.

Example 98

Using a procedure analogous to that described in Example 48, 4-hydroxy-6-methyl-5,6,7,8-tetrahydro-pyrido-[4,3-d]-pyrimidine of the formula

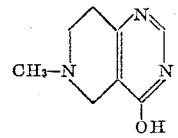

having a melting point of 190–192° C. was prepared from 1-methyl-3-carbethoxy-piperidone-(4) hydrochloride and formamidine sulfate.

Example 99

Using a procedure analogous to that described in Example 48, 2,6 - dimethyl - 4 - hydroxy-5,6,7,8-tetrahydro-pyrido-[4,3-d]-pyrimidine of the formula

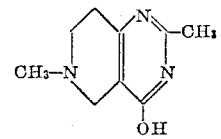

having a melting point of 214–216° C. was prepared from 1-methyl-3-carbethoxy-piperidone-(4) hydrochloride and acetamidine sulfate.

Example 100

Using a procedure analogous to that described in Example 48, 2-ethyl-4-hydroxy-6-methyl-5,6,7,8-tetrahydro-pyrido-[4,3-d]-pyrimidine of the formula

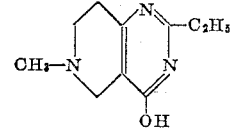

having a melting point of 165–167° C. was prepared from 1-methyl-3-carbethoxy-piperidone-(4) hydrochloride and α-amino-α-imino-propane sulfate.

Example 101

Using a procedure analogous to that described in Example 48, 2-n-propyl-4-hydroxy-6-methyl-5,6,7,8-tetrahydro-pyrido-[4,3-d]-pyrimidine of the formula

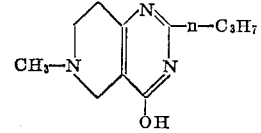

having a melting point of 159–160° C. was prepared from 1-methyl-3-carbethoxy-piperidone-(4) hydrochloride and α-amino-α-imino-butane sulfate.

Example 102

Using a procedure analogous to that described in Example 48, 2-isopropyl-4-hydroxy-6-methyl-5,6,7,8-tetrahydro-pyrido-[4,3-d]-pyrimidine of the formula

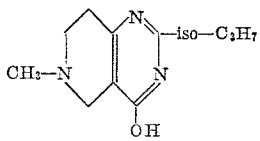

having a melting point of 185–186° C. was prepared from 1-methyl-3-carbethoxy-piperidone-(4) hydrochloride and α-amino-α-imino-isobutane sulfate.

Example 103

Using a procedure analogous to that described in Example 48, 2 - dimethylamino - 4 - hydroxy - 6 - n-propyl-5,6,7,8 - tetrahydro - pyrido - [4,3-d] - pyrimidine of the formula

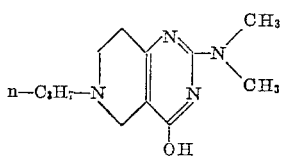

having a melting point of 162–163° C. was prepared from 1-n-propyl-3-carbethoxy - piperidone - (4) hydrochloride and N,N-dimethyl-guanidine sulfate.

Example 104

Using a procedure analogous to that described in Example 48, 2-ethyl-4-hydroxy-6-isopropyl-5,6,7,8-tetrahydro-pyrido-[4,3-d]-pyrimidine of the formula

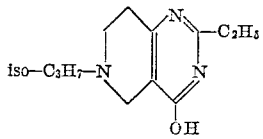

having a melting point of 161–163° C. was prepared from 1-isopropyl-3-carbethoxy - piperidone - (4) hydrochloride and α-amino-α-imino-propane sulfate.

Example 105

Using a procedure analogous to that described in Example 48, 2 - dimethylamino - 4 - hydroxy - 6-isopropyl-5,6,7,8 - tetrahydro - pyrido - [4,3-d] - pyrimidine of the formula

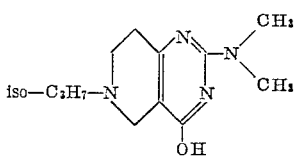

having a melting point of 173–174° C. was prepared from 1-isopropyl-3-carbethoxy-piperidone - (4) hydrochloride and N,N-dimethyl-guanidine sulfate.

Example 106

Using a procedure analogous to that described in Example 48, 2 - ethyl - 4 - hydroxy-6-isobutyl-5,6,7,8-tetrahydro-pyrido-[4,3-d]-pyrimidine of the formula

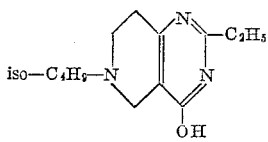

having a melting point of 176–178° C. was prepared from 1-isobutyl-3-carbethoxy-piperidone - (4) hydrochloride and α-amino-α-imino-propane sulfate.

Example 107

Using a procedure analogous to that described in Example 48, 2-methyl-4-hydroxy-6-n-hexyl-5,6,7,8-tetrahydro-pyrido-[4,3-d]-pyrimidine of the formula

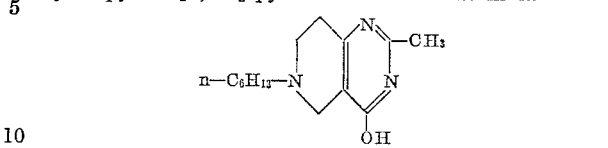

having a melting point of 138–139° C. was prepared from 1-n-hexyl-3-carbethoxy-piperidone-(4) hydrochloride and acetamidine sulfate.

Example 108

Using a procedure analogous to that described in Example 48, 2-ethyl - 4 - hydroxy-6-n-hexyl-5,6,7,8 - tetrahydro-pyrido-[4,3-d]-pyrimidine of the formula

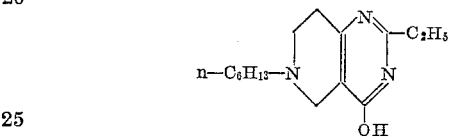

having a melting point of 173–174° C. was prepared from 1-n-hexyl-3-carbethoxy-piperidone-(4) hydrochloride and α-amino-α-imino-propane sulfate.

The compounds according to the present invention that is, the tetrahydro-pyrido-[4,3-d]-pyrimidine substitution products embraced by Formula I and their non-toxic acid addition salts, have useful pharmacodynamic properties. More particularly, they exhibit antiphlogistic, antipyretic, diuretic, bacteriostatic, sedative and coronary dilating activities.

Non-toxic, pharmacologically acceptable acid addition salts of the compounds defined by Formula I include, but are not restricted to, those formed with hydrochloric acid, hydrobromic acid, sulfuric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, nicotinic acid, 2-furoic acid, 8-chlorotheophylline and the like.

For pharmacological purposes, the compounds of the present invention are administered in the form of dosage unit compositions consisting essentially of an inert, physiologically compatible carrier having uniformly distributed therethrough one effective dosage unit of a compound of the invention. One effective dosage unit is 20–300 mgm., preferably 50–200 mgm.

The following examples illustrate various dosage unit compositions containing a compound according to the present invention as the active ingredient. The parts are parts by weight unless otherwise specified.

Example 109.—Suppositories

The suppositories are compounded from the following ingredients:

| | Parts |
|---|---|
| 2-isopropyl-4-hydroxy-6-n-butyl - 5,6,7,8 - tetrahydro-pyrido-[4,3-d]-pyrimidine | 100.0 |
| Suppository base (cocoa butter) | 1600.0 |
| Total | 1700.0 |

*Compounding procedure.*—The suppository base is melted by heating it to 40° C., whereupon the finely powdered pyrido-pyrimidine compound is stirred in. The mixture is homogenized and is then poured at 35° C. into cooled suppository molds which each hold 1700 mgm. of the mixture. Each suppository contains 100 mgm. of the active ingredient.

Example 110.—Aqueous suspension

The suspension is compounded from the following ingredients:

| | Parts |
|---|---|
| 2-isopropyl-4-hydroxy-6-n-butyl - 5,6,7,8 - tetrahydro-pyrido-[4,3-d]-pyrimidine | 2.0 |
| Carboxymethyl cellulose (high visc.) | 0.5 |
| Colloidal silicic acid | 1.5 |
| p-Hydroxy-benzoic acid methyl ester | 0.07 |
| p-Hydroxy-benzoic acid propyl ester | 0.03 |
| Cocoa essence | 1.5 |
| Sugar | 22.0 |
| Glycerin | 10.0 |
| Distilled water | 72.4 |
| Total | 110.0 |

*Compounding procedure.*—The distilled water is heated to 80° C. The p-hydroxy benzoic acid esters are dissolved in the hot water, and the colloidal silicic acid is stirred into the solution. Thereafter, a mixture of the sugar and the carboxymethyl cellulose is dissolved in the hot aqueous solution, and the resulting solution is cooled to room temperature. The glycerin and the cocoa essence are added, and then the pyrido-pyrimidine compound is stirred in. The entire mixture is then homogenized. 5 cc. of this suspension contain 100 mgm. of the active ingredient.

Example 111.—Tablets

The tablet composition is compounded from the following ingredients:

| | Parts |
|---|---|
| 2-dimethylamino-4-hydroxy - 6 - allyl-5,6,7,8-tetrahydro-pyrido-[4,3-d]-pyrimidine | 200.0 |
| Lactose | 200.0 |
| Corn starch | 145.0 |
| Colloidal silicic acid | 10.0 |
| Polyvinylpyrrolidone | 10.0 |
| Talcum | 30.0 |
| Magnesium stearate | 5.0 |
| Total | 600.0 |

*Compounding procedure.*—The pyrido-pyrimidine compound is admixed with the lactose, the corn starch and the colloidal silicic acid, and the resulting mixture is granulated by moistening it with an aqueous 8% solution of the polyvinylpyrrolidone and passing the moistened mass through a 1.5 mm.-mesh screen. The moist granuate is dried and again passed through the screen, and then the talcum and the magnesium stearate are blended in. The finished mixture is pressed into 600 mgm. tablets. Each table contains 200 mgm. of the active ingredient.

Example 112.—Hypodermic solution

The solution is compounded from the following ingredients:

| | Parts |
|---|---|
| 2-dimethylamino-4-hydroxy - 6 - allyl-5,6,7,8-tetrahydro-pyrido-[4,3-d]-pyrimidine | 50.0 |
| Tartaric acid | 20.0 |
| Double distilled water, by vol. | 2000.0 |

*Compounding procedure.*—The tartaric acid and then, while heating to 70° C., the pyrido-pyrimidine compound were dissolved in about four-fifths of the required amount of distilled water. The resulting solution is cooled to room temperature, diluted to the desired volume with the remaining amount of distilled water and filtered until free from suspended particles. The solution is then filled into white 2 cc.-ampules, which are sterilized for 20 minutes at 120° C. and sealed. Each ampule contains 50 mgm. of the active ingredient.

Obviously, the above dosage unit composition examples are merely illustrative of the various compositions which may be used to administer the compounds of the present invention. Those skilled in the art will readily understand that the particular tetrahydro-pyrido-pyrimidines in the above dosage unit composition examples may be replaced by any of the other compounds embraced by Formula I or their non-toxic, pharmacologically acceptable acid addition salts. Similarly, the amount of active ingredient in the examples may be varied within the dosage unit limits set forth above, depending upon particular requirements.

While the present invention has been illustrated with the aid of certain specific embodiments thereof, it will be readily apparent to others skilled in the art that the invention is not limited to these specific embodiments and that other changes and modifications may be made without departing from the spirit of the invention or the scope of the appended claims.

I claim:
1. 2-n-butyl-4-hydroxy-6,8-dimethyl - 5,6,7,8 - tetrahydro-pyrido-[4,3-d]-pyrimidine.
2. 2-isopropyl-4-hydroxy-6-n-butyl - 5,6,7,8 - tetrahydro-pyrido-[4,3-d]-pyrimidine.
3. 2-benzyl-4-hydroxy-6-isobutyl - 5,6,7,8 - tetrahydro-pyrido-[4,3-d]-pyrimidine.
4. 2-benzyl-4-hydroxy-6-n-hexyl - 5,6,7,8 - tetrahydro-pyrido-[4-3-d]-pyrimidine.
5. 2-dimethylamino-4-hydroxy-6-n - propyl - 5,6,7,8-tetrahydro-pyrido-[4,3-d]-pyrimidine.
6. 2-(di-n-butylamino)-4-hydroxy-6-n-propyl - 5,6,7,8-tetrahydro-pyrido-[4,3-d]-pyrimidine.
7. 2-dimethylamino-4-hydroxy-6-allyl - 5,6,7,8 - tetrahydro-pyrido-[4,3-d]-pyrimidine.
8. 2-dimethylamino-4-hydroxy-6-n-butyl - 5,6,7,8-tetrahydro-pyrido-[4,3-d]-pyrimidine.
9. 2-dimethylamino-4-hydroxy-6-isobutyl - 5,6,7,8-tetrahydro-pyrido-[4,3-d]-pyrimidine.
10. 2-(di-n-butylamino)-4-hydroxy-6-isobutyl - 5,6,7,8-tetrahydro-pyrido-[4,3-d]-pyrimidine.

References Cited by the Examiner

UNITED STATES PATENTS

| | | | |
|---|---|---|---|
| 2,697,710 | 12/1954 | Hitchings et al. | 260—256.4 |
| 2,890,152 | 6/1959 | Babcock et al. | 167—65 |
| 2,926,166 | 2/1960 | Hitchings et al. | 260—256.4 |
| 2,994,640 | 8/1961 | Zellner | 167—65 |
| 3,149,106 | 9/1964 | Loev | 260—256.4 |

OTHER REFERENCES

Cook et al.: Jour. Chem. Soc. (London), 1945, pages 399–402.

Fieser et al.: Organic Chemistry, D.C. Heath & Co., Boston, 1956, pages 46–67.

ALEX MAZEL, *Primary Examiner.*

NICHOLAS S. RIZZO, HENRY R. JILES, *Examiners.*

ALTON D. ROLLINS, MARY U. O'BRIEN,
*Assistant Examiners.*

UNITED STATES PATENT OFFICE
CERTIFICATE OF CORRECTION

Patent No. 3,306,901                      February 28, 1967

Gerhard Ohnacker

It is hereby certified that error appears in the above numbered patent requiring correction and that the said Letters Patent should read as corrected below.

Column 1, line 48, formula III, the formula should appear as shown below instead of as in the patent:

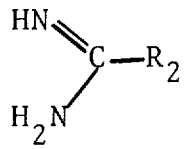

column 3, line 72, the last formula, the formula should appear as shown below instead of as in the patent:

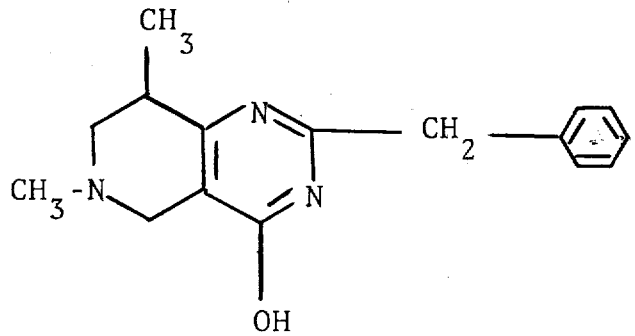

column 7, lines 66 to 71, the formula should appear as shown below instead of as in the patent:

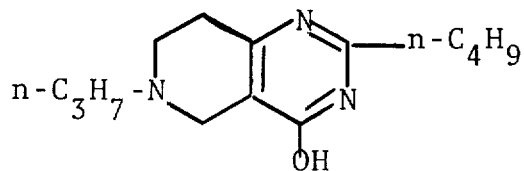

column 23, line 31, strike out "from 1-methyl-6-(or-2)-phenyl-5,6,7,8-tetrahydro-pyrido-"; column 26, line 27, for "173-174° C." read -- 146-147° C. --.

Signed and sealed this 7th day of November 1967.

(SEAL)
Attest:

EDWARD M. FLETCHER, JR.                  EDWARD J. BRENNER
Attesting Officer                          Commissioner of Patents